United States Patent [19]
Wild et al.

[11] Patent Number: 4,713,512
[45] Date of Patent: Dec. 15, 1987

[54] MICROWAVE STABLE TABLEWARE

[75] Inventors: Wolfgang Wild; Joachim Straub; Günter Landgraf, all of Hanau, Fed. Rep. of Germany

[73] Assignee: W. C. Heraeus GmbH, Hanau, Fed. Rep. of Germany

[21] Appl. No.: 897,772

[22] Filed: Aug. 18, 1986

[30] Foreign Application Priority Data

May 6, 1986 [DE] Fed. Rep. of Germany ....... 3615272

[51] Int. Cl.$^4$ .............................................. H05B 6/80
[52] U.S. Cl. .................... 219/10.55 E; 99/DIG. 14; D7/32; D7/35

[58] Field of Search ................ 219/10.55 E, 10.55 D, 219/10.55 F, 10.55 R; D7/29, 30, 31, 32, 33, 34, 35, 36; 126/390; 99/DIG. 14

[56] References Cited

U.S. PATENT DOCUMENTS

| | | | |
|---|---|---|---|
| D. 201,513 | 6/1965 | Masuda | D7/36 |
| D. 266,817 | 11/1982 | Williams | D7/35 |
| 4,486,640 | 12/1984 | Bowen et al. | 219/10.55 E |

*Primary Examiner*—Philip H. Leung
*Attorney, Agent, or Firm*—Felfe & Lynch

[57] ABSTRACT

Microwave-resistant tableware of siliceous material. The tableware has a precious metal decoration which consists of a pattern of dots. The distance between two adjacent dots amounts to at least 0.2 mm, and the maximum breadth of a dot amounts to 5 mm.

13 Claims, 3 Drawing Figures

MICROWAVE STABLE TABLEWARE

BACKGROUND OF THE INVENTION

The invention relates to microwave-stable tableware of siliceous material, such as porcelain, glass, stoneware, or ceramic. The term, "tableware," used herein, is to be understood to refer chiefly to plates, cups, platters, saucers, mugs, and drinking glasses.

A warning is stated in the operating instructions given by the manufacturers of microwave ovens which are used for heating foods, as well as in the technical literature, not to use tableware provided with metallic decoration, such as gold rims or the like, for heating foods in the microwave oven, because the decoration is destroyed by the effect of the microwave field, for example by electrical flashovers.

It is therefore the object of the present invention to create tableware of siliceous material provided with precious metal decoration which can be placed in a microwave oven for heating foods without destroying the precious metal decoration.

This problem is solved according to the invention, in microwave-stable tableware of the kind described above, in that it has precious metal decoration which consists of a pattern of markings, such as dots in which the distance between two adjacent dots amounts to at least 0.2 mm and the maximum extension of a dot amounts to 5 mm. Advantageously, the extension of a marking or dot is in the range from 0.3 to 4 mm. The precious metal decoration consists preferably of markings which are substantially equal in shape and/or size. The shape of the dots can be basically whatever is desired, as for example square, rectangular, circular, or elliptical.

Surprisingly, it has been found that tableware provided with precious metal decoration made in accordance with the invention can remain in the microwave field for any desired length of time—but at least for as long as it takes to cook a food that is on or in it—without destroying the precious metal decoration.

Precious metal decorations have proven especially durable which consist of markings with rounded margins, especially circular or elliptical markings or dots. Through the elimination of sharp corners the danger of electrical flashover and thus of the destruction of the decoration is even more greatly reduced.

The visual impression of the precious metal decoration made in accordance with the invention is especially good, i.e., the decoration strikes the human eye as being virtually "solid" if the sum of the areas of the markings amounts to about 60% of the total surface area of the decoration.

The thickness of a dot preferably ranges from 0.0001 to 0.1 mm, preferably from 0.0001 to 0.001 mm.

Any commercially available precious metal preparation can be used in producing the decoration; preparations containing gold, platinum, and palladium have proven especially desirable, such as bright gold, powdered gold, burnished gold or bright palladium, bright platinum, burnished platinum, or powdered platinum preparations which are fired onto the tableware. The precious metal preparation can be applied in the manner commonly known in the decorative art, for example by brush, feather, silk screen, direct printing or transfer printing, by stamping, or by an offset printing process.

Embodiments of the invention are represented in the drawings.

DESCRIPTION OF PREFERRED EMBODIMENTS

The piece of tableware 1, a plate, is provided with a gold decoration 2. The plate consists of porcelain. The decoration 2 was applied to the plate by silk-screen printing and fired at 830° C. As can be seen, the decoration appears solid to the eye. This is brought about by the fact that the sum of the areas of the individual dots amounts to 60% of the total area of the decoration. The decoration was placed in an ordinary microwave oven and repeatedly exposed to the microwave field for 15 minutes at a time without any evidence of destruction of the decoration. The same test was repeated with a slice of meat placed on the decorated plate; in this case too, no destruction or damage to the decoration could be observed.

Figure 1:
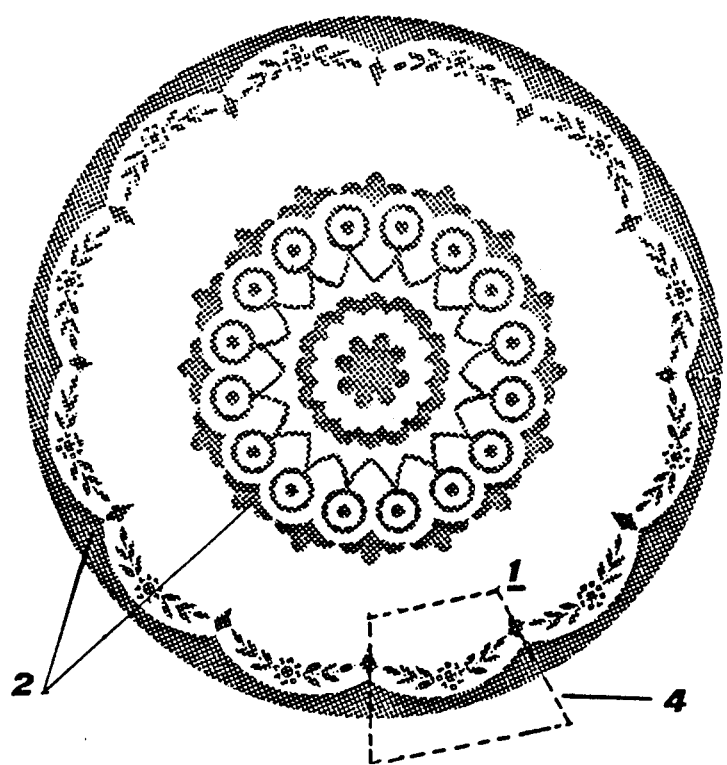
FIG. 1 is a plain view of a piece of tableware which is provided with a gold decoration formed according to the invention.
Figure 2:
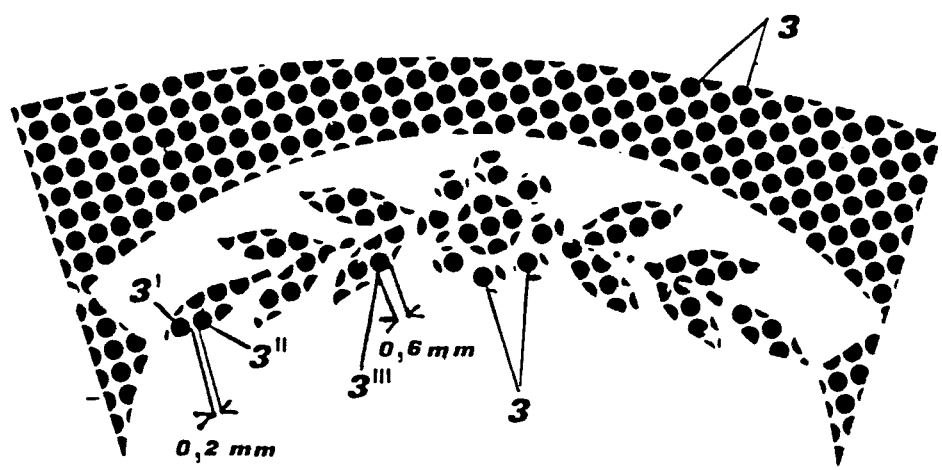
FIG. 2 is an enlarged section of the gold decoration according to FIG. 1.

As it appears from the enlarged section of the decoration, indicated in FIG. 1 by the broken outline 4, the gold decoration 2 consists of a great number of individual dots 3 which in this embodiment are circular in shape. The distance between two adjacent dots 3' and 3", amounts in the present case to 0.2 mm. The maximum extension of a dot (3' or 3") corresponds to the diameter of the circular dot, which is 0.6. mm. As it appears from FIG. 2, the gold decoration consists of dots of substantially equal shape and equal size.

Figure 3:
FIG. 3, represents examples of shapes of the dots.

FIG. 3 shows four different, preferred shapes of dots 3, namely the shape of a circle in FIG. 3A, the shape of a square in FIG. 3B, the shape of a rectangle in FIG. 3C, and the shape of an ellipse in FIG. 3D.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

What is claimed is:

1. Microwave stable tableware comprising a body made of siliceous material and having applied thereto a precious metal decoration of a plurality of markings, wherein said markings are separated by a distance of at least 0.2 mm from each other and the maximum extension of each of said markings is about 5 mm, wherein said decorated tableware can be exposed to a microwave field without destructive arcing.

2. Tableware according to claim 1, characterized in that the extension of each marking is from about 0.3 to about 4 mm.

3. Tableware according to claim 1, characterized in that the precious metal decoration comprises markings which are substantially equal in shape.

4. Tableware according to claim 1, characterized in that said markings have rounded marginal areas.

5. Tableware according to claim 4, characterized in that said markings are in the form of a circular or elliptical disk.

6. Tableware according to claim 1, characterized in that said markings amount to up to about 60% of the total surface area of said decoration, said surface area defined by a boundary, said boundary determined by placement of said markings on the surface of said tableware.

7. Tableware according to claim 1, characterized in that the precious metal decoration comprises fired gold, platinum, or palladium-containing coating.

8. Tableware according to claim 7, characterized in that the thickness of said marking is from about 0.0001 to about 0.1 mm.

9. Tableware according to claim 8, characterized in that the thickness of said markings is from about 0.0001 to about 0.001 mm.

10. Tableware of claim 1, wherein said siliceous material is porcelain.

11. Tableware of claim 1, wherein said siliceous material is glass.

12. Tableware of claim 1, wherein said siliceous material is stoneware.

13. Tableware of claim 1, wherein said siliceous material is ceramic.

* * * * *